(12) United States Patent
Raynal et al.

(10) Patent No.: US 7,815,171 B2
(45) Date of Patent: Oct. 19, 2010

(54) METHOD OF MIXING AND DISTRIBUTING A LIQUID PHASE AND A GASEOUS PHASE

(75) Inventors: Ludovic Raynal, Oullins (FR); Christophe Boyer, Charly (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 874 days.

(21) Appl. No.: 10/577,726

(22) PCT Filed: Oct. 29, 2004

(86) PCT No.: PCT/FR2004/002807
§ 371 (c)(1),
(2), (4) Date: Mar. 5, 2007

(87) PCT Pub. No.: WO2005/044441
PCT Pub. Date: May 19, 2005

(65) Prior Publication Data
US 2007/0252291 A1    Nov. 1, 2007

(30) Foreign Application Priority Data
Nov. 5, 2003    (FR) .................................. 03 13082

(51) Int. Cl.
*B01F 3/04*    (2006.01)
(52) U.S. Cl. ........................ 261/76; 261/98; 261/111; 261/117
(58) Field of Classification Search .................. 261/76, 261/96, 97, 98, 109, 110, 111, 117, 118, 261/DIG. 39
See application file for complete search history.

(56) References Cited

U.S. PATENT DOCUMENTS

| | | | | |
|---|---|---|---|---|
| 3,524,630 A * | 8/1970 | Marion | .................. | 261/76 |
| 4,073,832 A * | 2/1978 | McGann | .................. | 261/118 |
| 4,284,590 A * | 8/1981 | DeBoer et al. | .................. | 261/62 |
| 4,483,805 A * | 11/1984 | Glindsjo | .................. | 261/78.2 |
| 5,035,842 A * | 7/1991 | Mohn | .................. | 261/76 |
| 5,496,505 A * | 3/1996 | Walla et al. | .................. | 261/76 |
| 5,935,490 A * | 8/1999 | Archbold et al. | .................. | 261/76 |
| 6,000,418 A * | 12/1999 | Kern et al. | .................. | 137/7 |
| 6,047,956 A * | 4/2000 | Brazina | .................. | 261/78.1 |
| 6,138,378 A | 10/2000 | Takashina et al. | | |
| 6,220,578 B1 * | 4/2001 | Popov | .................. | 261/76 |
| 2003/0027089 A1 | 2/2003 | Mueller et al. | | |

* cited by examiner

Primary Examiner—Scott Bushey
(74) Attorney, Agent, or Firm—Millen, White, Zelano & Branigan, P.C.

(57) ABSTRACT

Method in which a gas and a liquid are mixed and distributed in a chamber that comprises a distribution means that consists of a compartment that is filled with liquid through which a gas stream passes. Said method is characterized in that liquid is injected either in gas countercurrent or in gas co-current into the gas passage section or sections through at least two orifices that are present in said compartment, whereby said two orifices are arranged approximately facing one another, and in that the diameter and the number of orifices and/or the speed V of the liquid at the outlet of each of the orifices and/or the distance d between two injection points placed facing one another are selected such that the Froude number $F_r$, defined by the equation:

$$Fr = \frac{V}{\sqrt{g \times d}}$$

Figure 1:
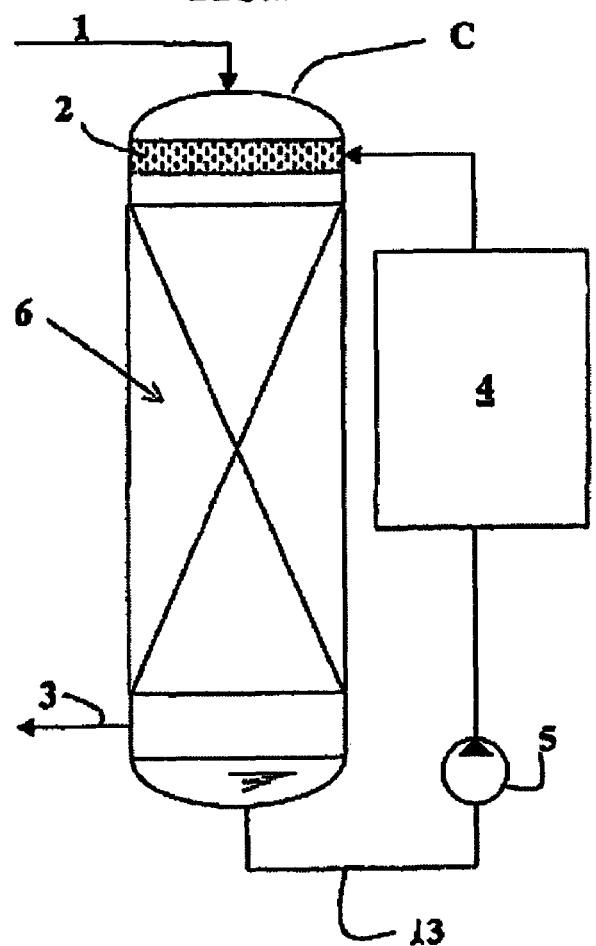

in which g is the gravitational constant, is greater than 0.5.

13 Claims, 4 Drawing Sheets

[Key:]

ratio de surface = surface ratio

METHOD OF MIXING AND DISTRIBUTING A LIQUID PHASE AND A GASEOUS PHASE

This invention relates to a method for using a device in which a thorough mixing between a gaseous phase and a liquid phase, on the one hand, and an essentially uniform radial distribution of said mixture within said device, on the other hand, are desired.

This invention generally finds its application in all of the processes for treatment of hydrocarbons using a liquid phase and a gaseous phase in at least one stage for separation, purification or chemical transformation, such as, for example, the processes for eliminating impurities contained in the hydrocarbons such as the processes for hydrodesulfurization or hydrodenitrating or the processes for selective hydrogenation and for scrubbing with amines.

This invention finds its application more particularly in the field of scrubbing acid gases that are obtained from a gas production field offshore or on land or present within a refinery. In the rest of this description, the particular case of treating acid gases is described. Of course, this example of application does not at all restrict the field of application of this invention. In particular, this method can be used in any type of process for purification of the gaseous phase and/or the liquid phase in which a thorough mixing and a uniform distribution of gaseous phases and liquid phases are necessary.

In the gas treatment processes, the object is to maximize the contact zones between the gas that is to be treated and a scrubbing liquid (of aqueous or organic solvent type); there is then a transfer of material from gas to liquid. In particular, the acid components of the $H_2S$, $SO_2$, $CO_2$, and $COS$ types are particularly targeted. These components may or may not react in the liquid phase; chemical or physical absorption respectively is then mentioned. The sizing of the column, inside of which the treatment is done, commonly called contactor in the field, is very generally determined based on the effective surface area that is necessary for an effective material transfer. In a known way, this area is furthermore substantially increased thanks to the use of packings that may be of the bulk, structured, monolithic or solid foam type. The packings are supplied with liquid or gas by distribution systems or else distributor plates, whose main objective is to ensure the most uniform spraying possible on the packing surface. The known devices, however, generally do not guarantee a thorough mixing between the phases that are present.

In addition to the spraying quality, a second desired quality is the flexibility of operation; it thus is desired to have a system that operates with the widest range possible of liquid and/or gas flow. In the case of simple systems, this range is generally limited for the liquid by a ratio of the volumetric flow rate of from 1 to 3, in some cases up to 10, between the minimum flow and the possible maximum flow. A third quality relates to the quality of the mixture between the two gaseous and liquid phases.

The European Patent Application EP-A-1180393 or its equivalent US 2002/0021991 proposes a device comprising a liquid compartment that is pierced by shafts for the passage of a gaseous phase that is introduced upstream in the column, this arrangement making it possible to obtain a suitable quality of the mixture and to control the liquid level within the distributor plate.

This invention describes a system whose use allows a uniformity of distribution, regardless of the conditions of use, in particular even when the vertical nature of the distribution column is not ensured, for example for use on an off-shore platform. This system also operates over a very wide range of operations in liquid flow, i.e., a ratio of the volumetric flow rate of from 1 to more than 20, and even more than 25. Finally, contrary to the majority of the devices of the prior art, it promotes a very good contact between the two liquid and gaseous phases, which exhibits in particular the decisive advantage of reducing the packing volume located downstream from the distributor plate. In addition, the combination of the two preceding factors allows a reduction in size of the column, which is reflected by a significant reduction of its cost, in particular for the applications in the field, generally carried out under high pressure.

More particularly, this invention relates to a method for mixing and distributing a gas and a liquid in a chamber comprising a distribution means constituted by a compartment that is filled with liquid and through which a gas stream passes. Said method is characterized in that:

Liquid is injected either in gas countercurrent or in gas co-current into the gas passage section or sections through at least two orifices that are present in said compartment, whereby said two orifices are arranged approximately facing one another, and The diameter and the number of orifices and/or the speed V of the liquid at the outlet of each of the orifices and/or the distance d between two injection points placed facing one another are selected such that the Froude number $F_r$, defined by the equation:

$$Fr = \frac{V}{\sqrt{g \times d}}$$

in which g is the gravitational constant, is greater than 0.5. The Froude number Fr is preferably greater than 1.

According to a first embodiment of this method, the distribution means consists of a compartment that is filled with liquid through which at least one passage section for the gas passes and in which the passage section or sections is or are pipes with essentially rectangular cross-sections.

According to another embodiment of this method, the distribution means consists of a compartment that is filled with liquid through which at least one passage section for the gas passes and in which the passage section or sections is or are shafts with essentially circular cross-sections.

According to this invention, the diameter of the shaft can be such that the liquid speed at the bottom of the shaft is less than $0.35\sqrt{gd_c}$, where dc is the mean diameter of a passage section and g is the gravity field acceleration. In general, the number of injection orifices facing one another is between 2 and 5.

According to an alternative embodiment of this method, the distribution means consists of a liquid compartment included in a continuous passage section of gas in said chamber, whereby said compartment comprises a central portion and arms placed on both sides of said central part and extends toward the wall of the chamber, orifices for injecting the liquid being provided on the arms such that an orifice has another identical orifice, opposite, placed on a contiguous arm.

In general, the number of injection points of the liquid phase is included between about 10 and about 1000 points per $m^2$. Typically, the size of the injection orifices of the liquid is between about 1 and about 20 mm. The distance d between two orifices for injecting liquid placed facing one another can be included between about 10 mm and about 500 mm.

The distribution plate is preferably placed in the chamber upstream from a bed of catalytic solid particles or from a packing bed of the bulk, structured, foam or monolithic type, in the direction of circulation of the liquid phase.

The invention also relates to the application of the method described above to the treatment of an acid gas that comprises at least one of the following compounds: $H_2S$, $SO_2$, $CO_2$, or COS. In particular, this method can be applied to processes that use at least one liquid phase and at least one gaseous phase in at least one stage of separation, purification or chemical transformation.

Figure 2:
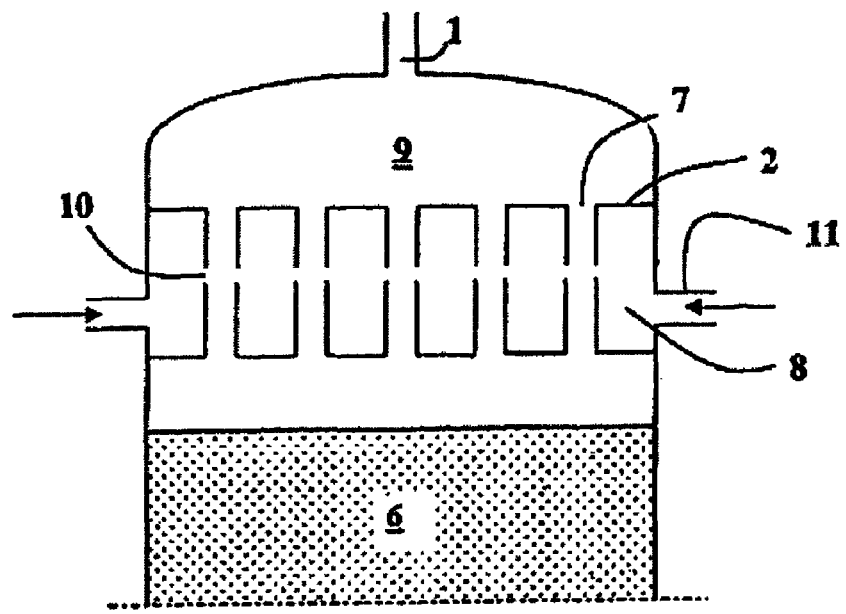
Figure 4:
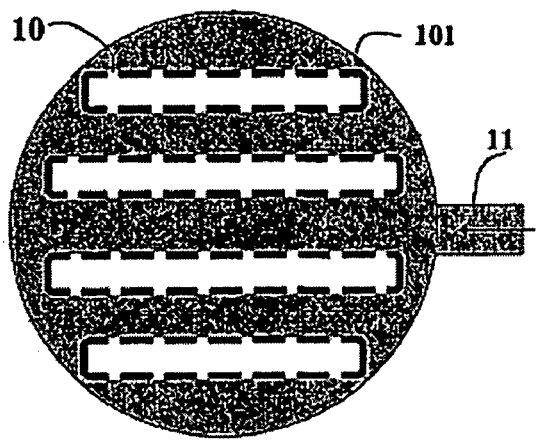
Figure 5A:
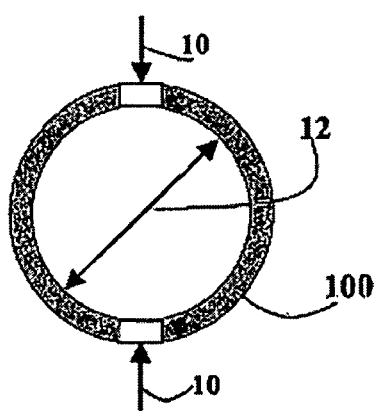
Figure 6:
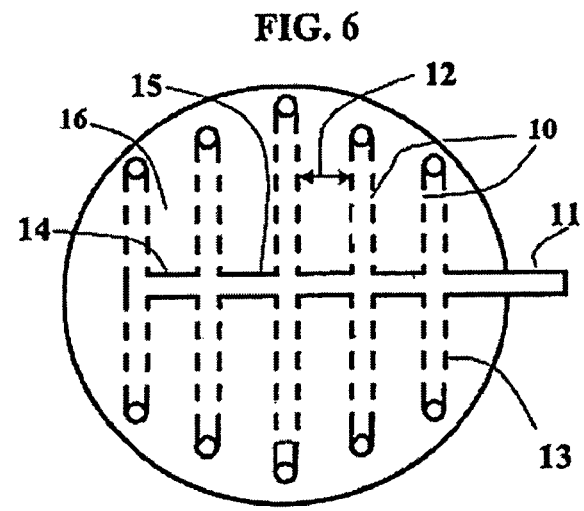

To facilitate the understanding of the invention, FIGS. 1 to 5 provide non-limiting embodiments of a device according to the invention that is equipped with a distribution internal placed, for example, at the top of the column, for example upstream from a packing bed or from a fixed catalytic bed that can operate in downward co-current liquid/gas flow. In particular, FIG. 1 relates to the description of an overall installation in which this invention typically can be used, FIG. 2 illustrates a possible embodiment of a column that is equipped with a liquid compartment through which passage sections for the gas pass, FIGS. 3 and 4 each represent an embodiment of the passage section of the gaseous phase through the liquid compartment, FIGS. 5a and 5b show more particularly the arrangement of the respective passage sections of the gaseous and liquid phases within the device, FIG. 6 illustrates another embodiment of the invention in which a liquid compartment is arranged in a continuous passage section of the gas within the column.

Figure 8:
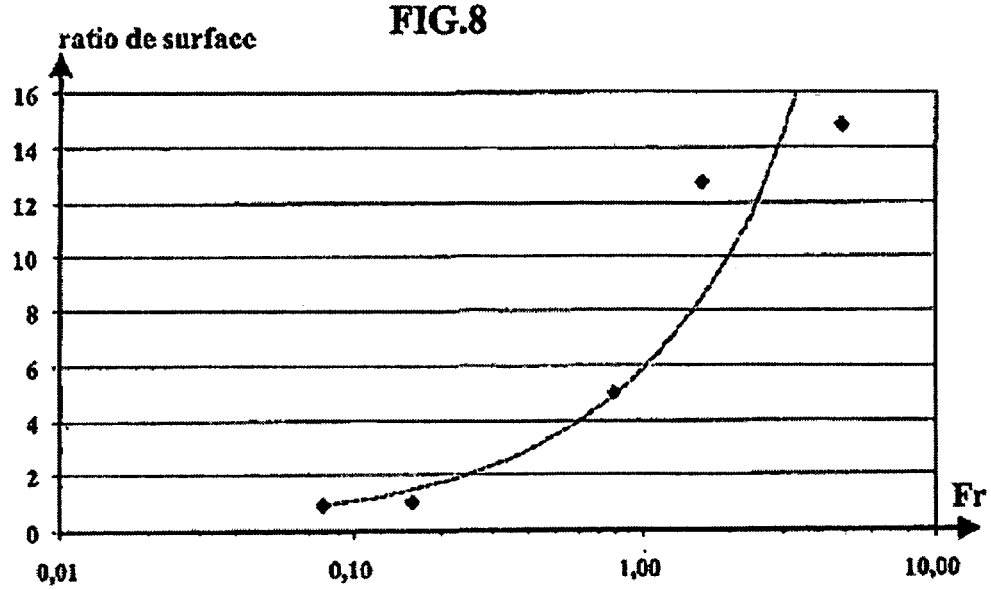

FIGS. 7A through 7D represent the results for four values of the Froude number for use with the invention, FIG. 8 is a graph showing the relationship between the surface ratio and the Froude number.

FIG. 1 shows a diagram of a column C in which this process can be implemented. The gaseous phase that is to be treated is introduced at the column top via a line 1, upstream from a distribution system or a distributor plate 2 in which a liquid phase is introduced and mixed with the gaseous phase. The two-phase mixture that is thus formed is then distributed radially within the column in a uniform manner toward a bed 6 that contains a packing of a given type (for example of the bulk, structured, metallic foam or ceramic, or else monolithic type), in which the separation of the acid gases is carried out. The gas itself is then evacuated to the bottom of the column via a line 3, whereby the liquid phase can be recycled after passage into a known regeneration system 4 via the distributor plate 2, under the action of a pumping means 5 and recirculation means 13. This regeneration system has as its function the at least partial elimination of acid compounds extracted in the liquid phase according to techniques that are well known to one skilled in the art.

Of course, without exceeding the scope of the invention, in the case where a chemical reaction is considered, for example if it is desired to purify or to transform the initial liquid feedstock of hydrocarbons by means of a standard process of hydrodesulfurization, hydrodenitrating, selective hydrogenation, etc., a bed of optionally catalytic solid particles can be arranged downstream from the distributor plate in the place of the packing bed.

Also, without exceeding the scope of the invention, the gas and liquid flows can be brought into contact in counter-current according to conditions usually defined by the specialist in the field, in particular such that the liquid is not entrained by the gas.

Figure 3:
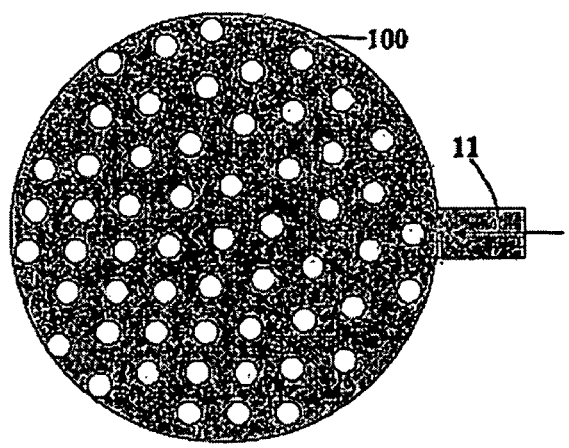

FIG. 2 illustrates in more detail the upper portion of the column C. A gaseous phase is injected essentially along the main axis of a reactor via the pipe 1 into a gas chamber 9. Said gas then flows using passage sections 7 through the liquid compartment 8 and is mixed with the liquid phase, whereby said mixture finally enters the packing bed (or the catalytic bed) 6 that is located downstream from the liquid compartment, in the direction of circulation of the fluids. Said passage sections can be shafts 100 as illustrated by FIG. 3 or pipes 101 with essentially rectangular cross-sections as illustrated by FIG. 4. Said shafts 100 or said pipes 101 also comprise perforations or orifices 10 that make possible the output under pressure of liquid from the liquid compartment 8 toward the passage section of gas 7. The gaseous phase penetrates through the passage sections 7 passing through the liquid compartment 8. The perforations or orifices 10 make possible the passage of the liquid under pressure from the compartment to the passage sections 7 and consequently the mixing of the two phases.

The use of rectangular pipes is particularly suitable in the case of a strong constraint of a loss of pressure on the gas, and also makes it possible to minimize the risks of entraining liquid via the gas in the case of an implementation in counter-current of fluids. In this configuration, the passage section of the gas can be significantly enlarged for a spacing between the injection points of the liquid and a size of the identical liquid injection orifices 10, relative to the embodiment that comprises cylindrical shafts illustrated by FIG. 3. In addition, this configuration has an easier assembly, whereby the number as well as the length of welds between the two end plates delimit the chamber and the upper and lower peripheries of the shafts or pipes are reduced.

The liquid compartment 8 is supplied essentially radially by the injection of the liquid phase through at least one injection line 11 relative to the primary axis of the reactor. This liquid compartment is kept under load, i.e., continually filled with liquid under pressure. Keeping the liquid compartment under load can be carried out without exceeding the scope of the invention according to any technique that is known to one skilled in the art, in particular by the presence on the upper portion of the liquid compartment of a purge valve that is not shown in FIG. 2 and that allows the evacuation of a gas fraction contained in said compartment.

While the liquid compartment is permanently kept under load, the implementation of this invention makes it possible to avoid any liquid level problem fluctuating upstream from the injection points of the liquid. The dimension 12 of the passage section 7 will be calculated such that there is no clogging of the shaft or the pipe by any technique that is known to one skilled in the art. For example, when the passage sections comprise shafts with essentially circular cross-sections, the conditions of injection of the liquid phase are optimized so that the liquid speed at the base of the shaft is not greater than $0.35\sqrt{gd_c}$, where $d_c$ is the diameter of a shaft and g is the gravity field acceleration.

Finally, the shafts 100 or the pipes 101 advantageously can be extended by a variable distance below the liquid compartment 8 so as to prevent a portion of the liquid from propagating under the outside face of the compartment and/or so as to reduce the space encompassed between the injection point of the mixture and the inlet into the bed.

Figure 5B:
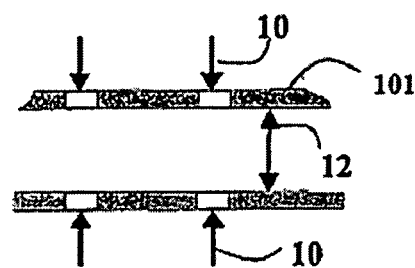
Figure 7A:
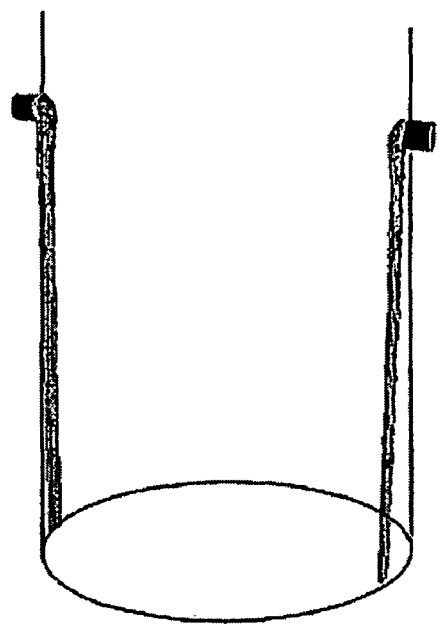
Figure 7B:
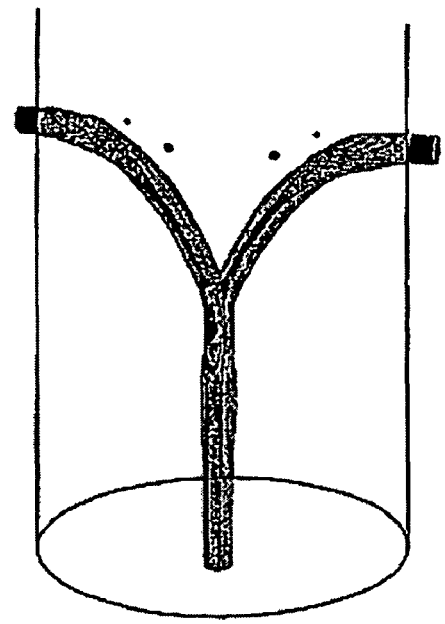
Figure 7C:
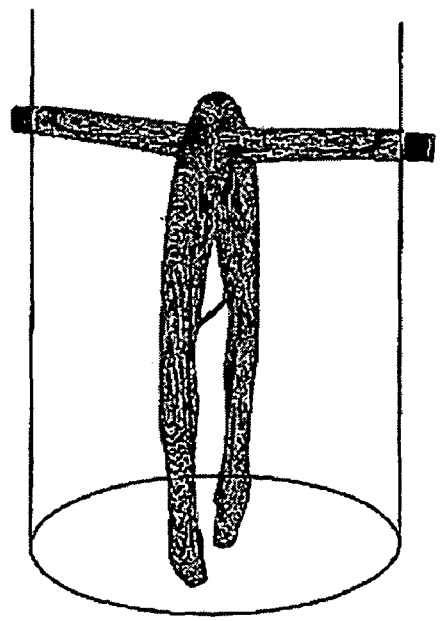
Figure 7D:
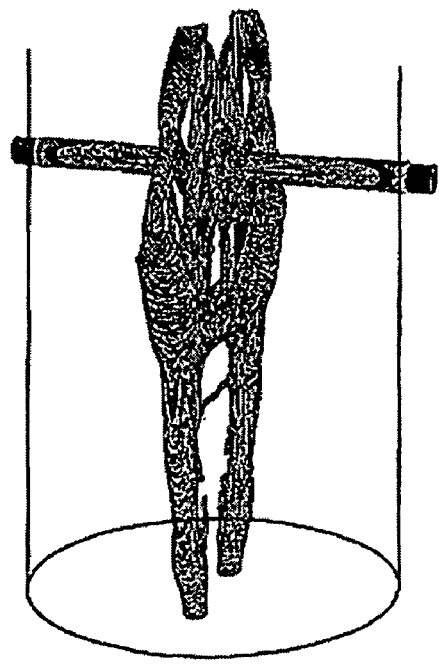

According to the invention, the passage sections 7 should be equipped with orifices 10 pierced on both sides of the shaft or pipe such that each orifice has another identical orifice facing said section that is placed at a distance d. FIGS. 5a and 5b illustrate a cutaway view of the arrangement of said orifices 10 in the particular cases respectively of a cylindrical shaft and a rectangular pipe.

This invention, however, is not limited to the two preceding embodiments that comprise at least one passage section of the gaseous phase passing through a liquid compartment. In a general manner, any geometric shape that is compatible with the implementation of this method can be considered.

In particular, according to another embodiment of the invention, it is possible to apply this method in a column that comprises a liquid compartment encompassed in a continuous passage section of the gas. A liquid compartment that is encompassed in the continuous passage section of the gas is defined in terms of this description in that the gas passage through the distribution device is carried out continuously over the entire section surface of the column comprising said compartment and not discretely via shafts or pipes, as illustrated by FIGS. 2, 3 and 4.

FIG. 6 illustrates such an application example. Over the entire section surface 16 of the column C, the gas continuously passes through a liquid compartment 14 that is supplied in liquid phase by means 11 and that comprises a central portion 15 and arms 13. The arms 13 extend toward the wall of the column C and are placed on both sides of said central portion 15. Two contiguous arms 13 of the device 14 are separated by a spacing 12. According to the invention, orifices 10 are provided on the arms 13 such that the orifices 10 most often have another identical orifice, opposite, placed at a distance d that is equal to the spacing 12 between two contiguous arms.

Of course, the arms being of different lengths so as to cover a maximum surface area of the section of the cylindrical column, it is obvious that certain orifices placed on the ends of arms 13 may not, by design according to the invention, have a counterpart facing them.

By application of this method, the applicant found that it was possible to improve considerably the quality of the mixing between the gaseous phase and the liquid phase as well as the uniformity of the radial distribution of the gas/liquid mixture, for example for the distributor plates as described above.

More particularly, according to a first aspect of the invention, the applicant found that the diameter of the orifices opposite, as well as the number thereof, can advantageously be adjusted by design based on the speed V of the liquid in the orifice and based on the distance d between two orifices opposite.

According to another aspect of this invention, for a given diameter and a given number of orifices, it will be possible, by an alternative application of this method, to adjust the speed V of the liquid in the orifice.

According to this method, the diameter and the number of orifices and/or the speed V of the liquid in the orifice and/or the distance d between two injection points placed opposite will be selected such that there exists for each orifice a condition on a Froude number, $F_r$, defined by the equation $$Fr = \frac{V}{\sqrt{g \times d}}$$

It was found by the applicant that it is possible to improve considerably the effectiveness of the mixture and the distribution of liquid and gaseous phases at the outlet of the distributor plate when this Froude number is more than 0.5, preferably more than 1, and very preferably more than 1.5.

Further, so as to avoid excessive pressure drops (i.e., for example, of more than 2 or 3 MPa), the Froude number according to the invention is preferably less than 200, preferably less than 150, and very preferably less than 100.

In practice, the speed can be calculated, for example, by one skilled in the art based on the liquid pressure existing in the liquid compartment or the flow rate of liquid entering into the liquid compartment via the injection line 11.

Regardless of the embodiment used, the number of injection points of the liquid phase will be encompassed, for example, between about 10 and about 1000 points per $m^2$, preferably between about 50 and 500 points per $m^2$, and very preferably between about 100 to 400 points per $m^2$.

The size of the injection orifices of the liquid is generally between about 1 and about 20 mm, preferably between about 1 and about 10 mm.

The distance d between two orifices for injection of the liquid that are placed facing one another can be between about 10 mm and about 500 mm, preferably between about 20 mm and about 200 mm.

The following examples are provided so as to show the advantages that are obtained from the application of this method but should not be considered, under any of the aspects described, as limiting the extent of this invention.

Calculations have been made with a digital simulation commercial code of the FLUENT 6.0® flow by means of the "volume of fluid" approach that is available on said code so as to represent the flow of liquid through two orifices placed facing one another for different values of the Froude number. The images of FIG. 7 represent the results that are obtained for four values of the Froude number described above, namely 0.16, 0.8, 1.6 and 4.8 respectively for the images a,b, c and d. In the case a, it is observed that the liquid flows along the inside wall of the shaft and there is a very weak interaction between the gas and the liquid. In the case b, the liquid jets obtained from the two orifices that face one another impact against one another to melt into a single liquid jet that flows into the center of the shaft. In cases c and d, the speed of impact between the two jets is strong enough that the latter explode, generating a sheet of liquid. In the case d, the impact is so violent that the sheet of liquid disintegrates itself into several streams and drops of liquid so that the surface area between the gas and the liquid is very greatly increased.

The graph of FIG. 8 was obtained by determining the contact surface area between the gaseous phase and the liquid phase and by considering that the surface area obtained in the case of the smallest Froude number (Fr=0.08) is the reference contact surface area. The ordinate of the graph of FIG. 8, called a surface ratio, therefore corresponds to the ratio between the value of the contact surface area corresponding to the Froude number plotted on the abscissa and the reference contact surface area. The curve that is shown in this graph shows a very strong influence of the Froude number on this ratio and therefore on the contact surface area between the gas and the liquid. Thus, below a value of the Froude number of 0.5, the contact surface area is small and not very affected by the value of the Froude number. Above 0.5, and even 1 or 1.5, this surface area quickly increases with the Froude number, and for a Froude number of 5, the latter is close to 15× greater than the reference value.

The processes of separation, purification and chemical transformation can therefore be improved considerably by means of the mixing and distributing method according to the invention that makes possible a better distribution of the two phases.

For example, the respect of a limit value of the Froude number for each orifice during the sizing of the distributor plate will make it possible to ensure a good contact between the gas and the liquid even for the minimum value of the liquid flow rate considered for supplying the latter.

The invention claimed is:

1. A method for mixing and distributing a gas and a liquid in a chamber comprising a distribution means constituted by a compartment that is filled with liquid through which a gas stream passes, whereby said method is characterized in that:

Liquid is injected either in gas countercurrently or in gas co-currently into a gas passage section or sections through at least two orifices that are present in said compartment, whereby said two orifices are arranged approximately facing one another, and The diameter and the number of orifices and/or the speed V of the liquid at the outlet of each of the orifices and/or the distance d between two injection points placed facing one another are selected such that the Froude number $F_r$, defined by the equation:

$$Fr = \frac{V}{\sqrt{g \times d}}$$

in which g is the gravitational constant, is more than 0.5.

2. A method according to claim 1, wherein the Froude number $F_r$ is more than 1.

3. A method according to claim 1, wherein the distribution means comprises a compartment that is filled with liquid through which at least one passage section for the gas passes and in which the passage section or sections are pipes of essentially rectangular cross-sections.

4. A method according to claim 1, wherein the distribution means comprises a compartment that is filled with liquid through which at least one passage section for the gas passes and in which the passage section or sections is or are shafts that are essentially circular cross-sections.

5. A method according to claim 4, wherein the diameter of the shaft is such that the speed of the liquid at the base of the shaft is less than $0.35\sqrt{gd_c}$, where $d_c$ is the mean diameter of a passage section, and g is the gravity field acceleration.

6. A method according to claim 4, wherein the number of injection orifices facing one another is between 2 and 5.

7. A method according to claim 1, wherein the distribution means comprises a liquid compartment encompassed in a continuous passage section of the gas in said chamber, whereby said compartment comprises a central portion and arms that are placed on both sides of said central portion and that extend toward walls of the chamber, whereby orifices for injection of the liquid are provided on the walls so that an orifice has another identical orifice, opposite, placed on a contiguous arm.

8. A method according to claim 1 in which the number of injection points of the liquid phase is encompassed between about 10 and about 1000 points per $m^2$.

9. A method according to claim 1, wherein the size of the orifices for injection of the liquid is encompassed between about 1 and about 20 mm.

10. A method according to claim 1, wherein the distance d between two orifices for injection of the liquid placed facing one another can be encompassed between about 10 mm and about 500 mm.

11. A method according to claim 1, wherein a distribution plate is placed in the chamber upstream from a bed of catalytic solid particles or from a packing bed of bulk, structured, foam, or monolithic type, in the direction of circulation of the liquid phase.

12. A method according to claim 1, wherein the gas is an acid gas comprising at least one of the following compounds: $H_2S$, $SO_2$, $CO_2$, and COS.

13. A method according to claim 1 comprising at least one liquid phase and at least one gaseous phase in at least one stage for separation, for purification or for chemical transformation.

* * * * *